US008050324B2

United States Patent
Yu et al.

(10) Patent No.: US 8,050,324 B2
(45) Date of Patent: Nov. 1, 2011

(54) METHOD AND APPARATUS FOR SELECTING A REFERENCE FRAME FOR MOTION ESTIMATION IN VIDEO ENCODING

(75) Inventors: Shan Yu, Glenview, IL (US); Faisal Ishtiaq, Chicago, IL (US)

(73) Assignee: General Instrument Corporation, Horsham, PA (US)

( * ) Notice: Subject to any disclaimer, the term of this patent is extended or adjusted under 35 U.S.C. 154(b) by 1372 days.

(21) Appl. No.: 11/564,606

(22) Filed: Nov. 29, 2006

(65) Prior Publication Data

US 2008/0123733 A1    May 29, 2008

(51) Int. Cl.
*H04N 7/12* (2006.01)
*G06K 9/36* (2006.01)
(52) U.S. Cl. .................... 375/240.16; 382/236
(58) Field of Classification Search ............ 375/240.01, 375/240.13, 240.16; 348/208.6; 382/236
See application file for complete search history.

(56) References Cited

U.S. PATENT DOCUMENTS

| 6,996,177 | B1 * | 2/2006 | Beuker | 375/240.16 |
| 7,227,896 | B2 * | 6/2007 | Sun | 375/240.16 |
| 2007/0047653 | A1 * | 3/2007 | Kim et al. | 375/240.16 |
| 2010/0079606 | A1 * | 4/2010 | Batur | 348/208.6 |

* cited by examiner

*Primary Examiner* — Gims Philippe

(57) ABSTRACT

Method and apparatus for selecting a reference frame for motion estimation in a video encoder is described. In one example, motion estimation is performed on a current macroblock in a current frame with respect to a reference frame to obtain a motion vector, a sum of absolute difference (SAD), a global motion vector, and an average SAD. A first relative change of the motion vector with respect to the global motion vector is computed. A second relative change of the SAD with respect to the average SAD is computed. A functional based on the first relative change, the second relative change, a first parameter, and a second parameter is computed. The functional is compared with a threshold. The reference frame is selected if the functional satisfies the threshold.

20 Claims, 3 Drawing Sheets

METHOD AND APPARATUS FOR SELECTING A REFERENCE FRAME FOR MOTION ESTIMATION IN VIDEO ENCODING

BACKGROUND OF THE INVENTION

1. Field of the Invention

The present invention relates to video encoders and, more particularly, to a method and apparatus for selecting a reference frame for motion estimation in video encoding.

2. Description of the Background Art

Video compression technology plays an important role in video storage and video transmission over wired and wireless channels. The technology reduces the representation of the original video data by applying mathematical transformation, quantization, and encoding to reduce redundancies within a video sequence. An important process in video compression is motion estimation and motion compensation.

A video sequence is composed of a sequence of frames. When a video sequence is compressed, a frame is coded based on its difference from another frame. Each frame is divided into blocks. A block is coded based on the difference from a matching block on another frame, which is referred to as a "reference frame." The process of identifying such a matching block is known as motion estimation. Motion estimation also identifies the position of the best matching block relative to the reference block, which is referred to as the "motion vector."

While there are many criteria and techniques for fining a motion vector, the most commonly used approach is to identify a displacement vector (i,j) that minimizes the distortion between two blocks, or:

$$D(i, j) = \sum_{m=0}^{M-1} \sum_{n=0}^{N-1} |r_{m,n} - S_{m+i,n+j}|, \; i, j \in [-p, p-1]. \quad \text{Eq. 1}$$

The quantity $r_{m,n}$ is a pixel (m,n) on a reference block r; $S_{m+i,n+j}$ is a pixel (m+i, n+j) on a candidate block S; [−p, p−1] is a search window for the motion vector; M×N is the dimension of a coding block; and D(i,j) is known as a sum of absolute difference (SAD).

Video encoding standards, such as MPEG-2, H.263, MPEG-4 (part 2), and H.264 (also known as MPEG-4 part 10 or Advanced Video Coding (AVC)), provide a syntax for compressing a video sequence. In MPEG-2, H.263, and MPEG-4, motion estimation is computed using a single reference frame. This reference frame is the most recently encoded, and hence reconstructed, frame prior to coding the current frame. Newer standards, such as H.264, allow for multiple reference frames in which the candidate block can be searched. This is due to the fact that certain video scenes may have sudden scene changes or cuts, where the best reference frame is not the very last reconstructed frame. Allowing the encoder to use the best matched reference frame rather than always the very last reconstructed frame provides for improved coding efficiency.

One technique for selecting a candidate block for motion estimation among multiple reference frames is to test every block within a search window on every reference frame using Equation 1. The computation in finding a satisfactory result is costly and time consuming. Thus, this technique is impractical for many real-time applications. Simplifying the process and computations for the decision of selecting a reference frame from which the candidate block is to be selected will reduce encoding cost.

The reference implementation from the H.264 standards uses an exhaustive approach for determining a candidate reference frame. The exhaustive approach examines all possible reference frames and their corresponding bit-rate cost and distortion. The goal of this technique, referred to as the rate-distortion optimization, is to achieve the best encoding result in terms of visual quality and coding rates. In order to perform the rate-distortion optimization, the encoder encodes the video by exhaustively searching the best reference frame in the rate-distortion sense among all possible reference frames. As a result, the computational complexity of the encoder using the rate-distortion optimization is increased dramatically, which limits or prohibits the use of such an encoder for practical applications, such as real-time video communications.

Accordingly, there exists a need in the art for an improved method and apparatus selecting a reference frame for motion estimation in video encoder.

SUMMARY OF THE INVENTION

Method and apparatus for selecting a reference frame for motion estimation in a video encoder is described. In one embodiment, motion estimation is performed on a current macroblock in a current frame with respect to a reference frame to obtain a motion vector, a sum of absolute difference (SAD), a global motion vector, and an average SAD. A first relative change of the motion vector with respect to the global motion vector is computed. A second relative change of the SAD with respect to the average SAD is computed. A functional based on the first relative change, the second relative change, a first parameter, and a second parameter is computed. The functional is compared with a threshold. The reference frame is selected if the functional satisfies the threshold.

BRIEF DESCRIPTION OF DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures.

DETAILED DESCRIPTION OF THE INVENTION

Figure 1:
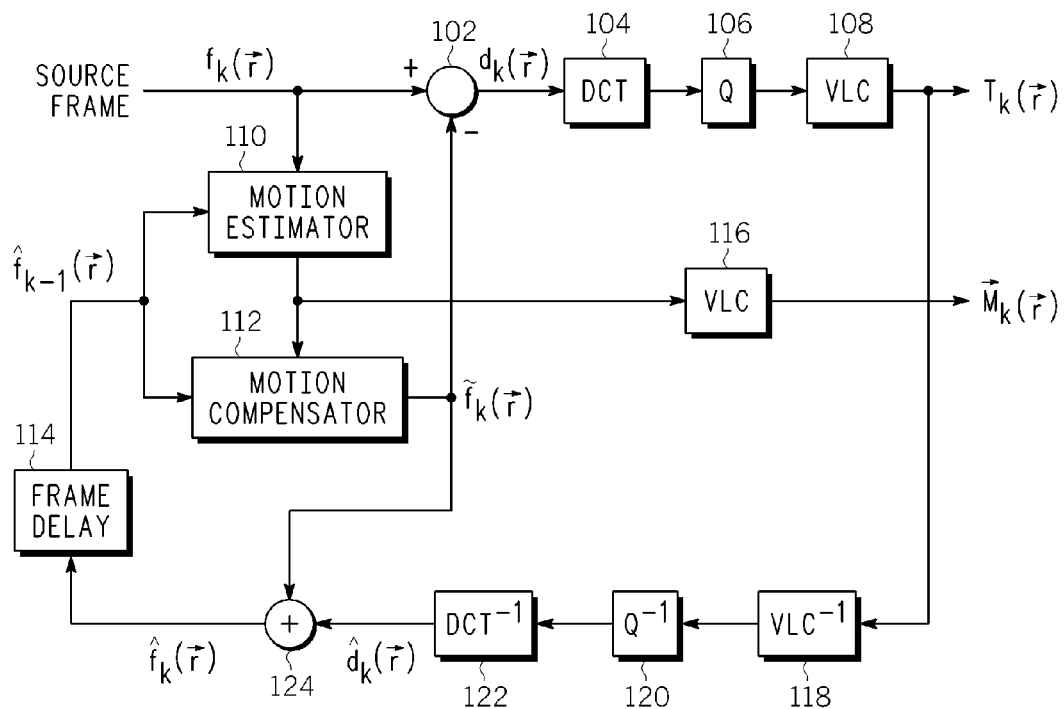
FIG. 1 is a block diagram depicting an exemplary embodiment of a video encoder.

FIG. 1 is a block diagram depicting an exemplary embodiment of a video encoder 100. The video encoder 100 includes a subtractor 102, a discrete cosine transform (DCT) module 104, a quantizer (Q) 106, a variable length coder (VLC) 108, a motion estimator 110, a motion compensator 112, a frame delay module 114, a VLC 116, an inverse VLC (VLC$^{-1}$) 118, an inverse quantizer (Q$^{-1}$) 120, an inverse DCT module (DCT$^{-1}$) 122, and a summer 124. The video encoder 100 receives a sequence of source frames and processes each source frame on a block by block basis. In MPEG standards, for example, source frames are partitioned into 16×16 regions referred to as macroblocks.

A source frame, $f_k(\vec{r})$, and a motion compensated frame, $\tilde{f}_k(\vec{r})$, are input to the subtractor 102. The subtractor 102 computes a difference between the source frame and the motion compensated frame, $d_k(\vec{r})$, which is provided to the DCT module 104. The DCT module 104 transforms the difference signal from the pixel domain to the frequency domain using a DCT algorithm to produce a set of coefficients. The quantizer 106 quantizes the DCT coefficients. The VLC 108 codes the quantized DCT coefficients using a variable length coding scheme to produce a coded frame, $T_k(\vec{r})$.

The coded frame is provided to the inverse VLC 118, which performs the inverse operation of the VLC 108 to recover the quantized DCT coefficients. The inverse quantizer 120 performs the inverse operation of the quantizer 106 to recover the DCT coefficients. The inverse DCT module 122 performs the inverse operation of the DCT module 104 to produce an estimated difference signal, $\hat{d}_k(\vec{r})$. The motion compensated frame, $\tilde{f}_k(\vec{r})$, and the estimated difference signal are summed by the summer 124 to produce an estimated frame $\hat{f}_k(\vec{r})$. The estimated frame is stored by the frame delay module 114. The frame delay module 114 provides a previous estimated frame, $\hat{f}_{k-z}(\vec{r})$ as output to both the motion estimator 110 and the motion compensator 112 where z can range from 1 to the maximum number of allowed reference frames. For example, in the case of H.263 and MPEG-4 Part 2, z=1.

The motion estimator 110 also receives the source frame, $f_k(\vec{r})$. The motion estimator 110 performs a motion estimation algorithm using the source frame and the previous estimated frame (i.e., reference frame) to produce motion estimation data. The motion estimation data is in the form of motion vectors for the macroblocks of the source frame. The motion estimation data is provided to the VLC 116 and the motion compensator 112. The VLC 116 codes the motion estimation data to provide coded motion estimation data, $\vec{m}_k$. The motion compensator 112 performs a motion compensation algorithm using the previous estimated frame and the motion estimation data to produce the motion compensated frame, $\tilde{f}_k(\vec{r})$. Motion estimation and motion compensation algorithms are well known in the art.

In one embodiment, for each macroblock in the current frame, the motion estimator 110 is capable of searching multiple reference frames to identify a candidate macroblock for motion estimation. For example, the video encoder 100 may be compliant with International Telecommunications Union (ITU) H.264 standards. As described below, the motion estimator 110 provides a computationally efficient process for detecting a candidate reference frame from which a candidate block for the motion estimation process will be found. The motion estimator 110 uses motion vector and previous motion estimation statistics during the encoding process to select a reference frame. The reference frame selection algorithm implemented by the motion estimator 110 reduces the need for exhaustively searching potential reference frames by using a predetermined bias toward the temporally closest frame. The reference frame selection algorithm also poses minimum computation overhead to the encoding process.

Using a given reference frame, let $\vec{V}_i(n)$ be the resulting motion vector of a current macroblock, n, where n=0, 1, . . . , M, in frame i, and M is the total number of macroblocks in a frame. Furthermore, define a global motion vector for each macroblock n as:

$$G_{mv_i}(n).x = \frac{\sum_{p=0}^{i} V'_p(n).x}{N_{me}} ; \quad \text{Eq. 2}$$

$$G_{mv_i}(n).y = \frac{\sum_{p=0}^{i} V'_p(n).y}{N_{me}} . \quad \text{Eq. 3}$$

The quantities $G_{mv_i}(n).x$ and $G_{mv_i}(n).y$ are the x and y components of the global motion vector, $G_{mv_i}$ and $V_p'(n).x$ and $V_p'(n).x$ are the final motion vectors used to encode macroblock n for frame p. In the event that this macroblock has been INTRA coded, the motion vector values $V_p'(n).x$ and $V_p'(n).x$ are set to zero for the corresponding frame p. The quantity $N_{me}$ is the number of frames for which the current macroblock n has been coded using the motion vectors $V_p'(n).x$ and $V_p'(n).x$ while excluding those frames in which the macroblock has been coded as an INTRA macroblock.

In addition to the global motion vector define a temporal scale r to be calculated as:

$$r = \frac{t_i - t_{i-1}}{t_{i-1} - t_{i-2}}, \quad \text{Eq. 6}$$

where $t_i$ is the time for encoded frame i. Based on the above, then the relative change of the current motion vector under consideration $\vec{V}_i(n)$ with respect to the global motion vector available for the previous frame, $G_{mv_{i-1}}$, scaled to account for the temporal differences, can be defined as:

$$\Delta_{mv_i}(n).x = \frac{V_i(n).x}{G_{mv_{i-1}}(n).x * r} ; \quad \text{Eq. 7}$$

$$\Delta_{mv_i}(n).y = \frac{V_i(n).y}{G_{mv_{i-1}}(n).y * r} . \quad \text{Eq. 8}$$

Similarly, if $D_i(n)$ represents the minimum SAD value for the current macroblock n in frame i, and $\overline{D}_i(n)$ is the mean value of $D_i(n)$ over all previously encoded frames, then:

$$\Delta_{sad_i}(n) = \frac{D_i(n)}{\overline{D}_i(n)} . \quad \text{Eq. 9}$$

Equation 9 represents the relative change of the SAD value of the current macroblock with respect to the average value. Using $\Delta_{mv_i}(n).x$, $\Delta_{mv_i}(n).y$, and $\Delta_{sad_i}(n)$, the x and y components of a functional, F, are calculated as:

$$F_x = \alpha_x \Delta_{mv_i}(n) \cdot x + \beta_x \Delta_{sad_i}(n) \qquad \text{Eq. 10;}$$

$$F_y = \alpha_y \Delta_{mv_i}(n) \cdot y + \beta_y \Delta_{sad_i}(n) \qquad \text{Eq. 11.}$$

The quantities $\alpha_x$, $\alpha_y$, $\beta_x$, and $\beta_y$ are weighting factors. They can be statically defined or adapted throughout the encoding process. In one embodiment, alpha and beta satisfy the following:

$$\alpha_x + \beta_x = 1 \qquad \text{Eq. 12;}$$

$$\alpha_y + \beta_y = 1 \qquad \text{Eq. 13.}$$

Selecting an alpha and beta that satisfies equations 12 and 13 provide a normalized functional. The values of $\alpha_x$, $\alpha_y$, $\beta_x$, and $\beta_y$ determine the relative importance that the motion vector and SAD play in the selection of reference frames.

Figure 2:
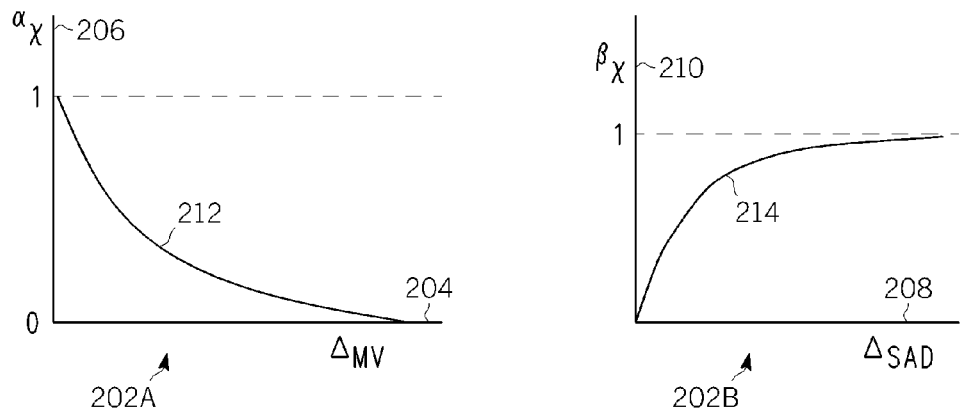
FIG. 2 are graphs illustrating an exemplary embodiment of selecting parameters for a functional in accordance with one or more aspects of the invention.

FIG. 2 contains graphs illustrating an exemplary embodiment of selecting the x-component of alpha and beta in accordance with one or more aspects of the invention. Given the x-components, the y-components of alpha and beta can be computed using Equations 12 and 13. A graph 202A includes an axis 204 representing values of $\Delta_{mv}$.x increasing from left to right, and an axis 206 representing values of $\alpha_x$ between 0 and 1. A graph 202B includes an axis 208 representing values of $\Delta_{sad}$ increasing from left to right, and an axis 210 representing values of $\beta_x$ between 0 and 1. The quantity $\alpha_x$ is determined by a curve 212. For small $\Delta_{mv}$.x, $\alpha_x$ approaches one. For large $\Delta_{mv}$.x, $\alpha_x$ approaches 0. Otherwise, $\alpha_x$ is a non-linear function of $\Delta_{mv}$. One such function can be in the form of:

$$\alpha_x = \begin{cases} \exp(-\Delta_{mv} \cdot x) & \text{for} \Delta_{mv} \cdot x \geq 0 \\ 0 & \text{for} \Delta_{mv} \cdot x < 0 \end{cases}$$

The quantity $\beta_x$ is determined by a curve 214. For small $\Delta_{sad}$, $\beta_x$ approaches zero. For large $\Delta_{sad}$, $\beta_x$ approaches one. Otherwise, $\beta_x$ is a non-linear function of $\Delta_{sad}$. One such function can be in the form of:

$$\beta_x = \begin{cases} 1 - \exp(-\Delta_{sad}) & \text{for} \Delta_{sad} \geq 0 \\ 0 & \text{for} \Delta_{sad} < 0 \end{cases}$$

The related y components, $\alpha_y$ and $\beta_y$ can be found with similar if not identical functional relationships between $\Delta_{mv}$.y and $\alpha_y$ and between $\beta_y$ and $\Delta_{sad}$.

Figure 3:
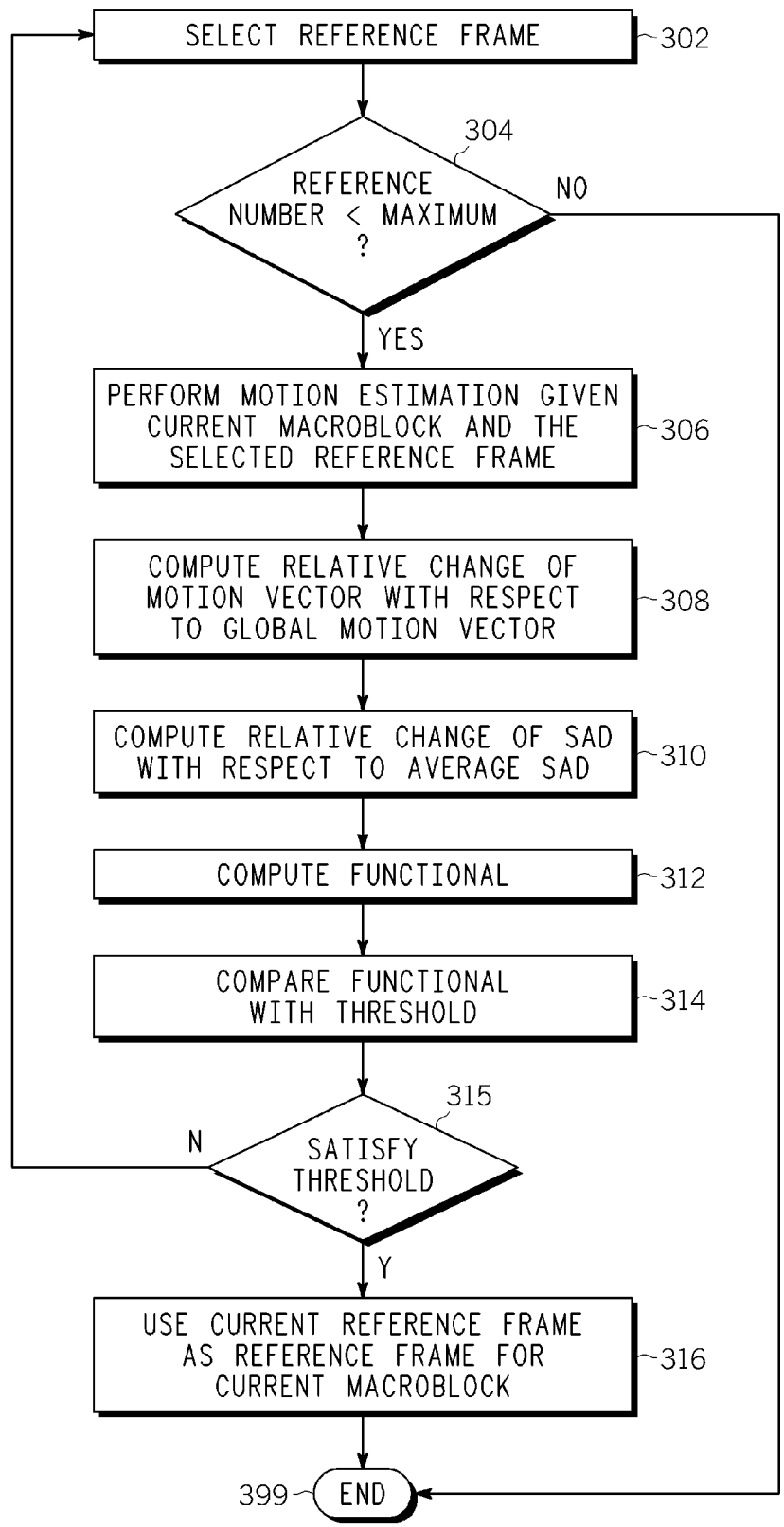
FIG. 3 is a flow diagram depicting an exemplary embodiment of a method for selecting a reference frame from which a candidate block for the motion estimation process will be found in accordance with one or more aspects of the invention.

FIG. 3 is a flow diagram depicting an exemplary embodiment of a method 300 for selecting a reference frame from which a candidate block for the motion estimation process will be found in accordance with one or more aspects of the invention. Assume a current macroblock, n, of a current frame, i, is being processed by the motion estimator 110. The method 300 begins at step 302, where a reference frame is selected. At step 304, a determination is made whether the number of the reference frame being considered as a predictor is less than a maximum reference number. That is, there is a maximum number of previously encoded reference frames from which the reference frame for the current macroblock is to be selected. If the number of the reference frame selected in step 302 is less than the maximum, the method 300 proceeds to step 306. Otherwise, the method 300 ends at step 399.

At step 306, motion estimation is performed given the current macroblock and the selected reference frame. Motion estimation produces a motion vector $\vec{V}_i(n)$ and a minimum SAD $D_i(n)$ for the current macroblock. Motion estimation also maintains a global motion vector $G_{mv_{i-1}}(n)$ and a mean value of the SAD $\overline{D}_i(n)$ for the current macroblock. At step 308, the relative change of the motion vector with respect to the global motion vector is computed (referred to as $\Delta_{mv_i}(n)$ above) for both the x and y components. At step 310, the relative change of the minimum SAD with respect to the mean value of the SAD is computed (referred to as $\Delta_{sad_i}(n)$ above). At step 312, a functional is computed. The functional includes x and y components and is computed using Equations 10 and 11, described above. In one embodiment, the alpha and beta quantities in the functional are statically defined for the entire encoding process. Alternatively, the alpha and beta quantities in the functional are adapted throughout the encoding process. In either case, alpha and beta have particular values for the current macroblock.

At step 314, the functional is compared with one or more threshold values. The threshold values are discussed below. At step 315, a determination is made whether the functional satisfies the thresholds. If the functional does not satisfy the threshold value, the method 300 returns to step 302, where another candidate reference frame is selected. Otherwise, the method 300 proceeds to step 316, where the currently selected reference frame is used as a reference frame for the current macroblock. That is, the currently computed motion vector and minimum SAD are used. In this case $V_i'(n) \cdot x = V_i(n) \cdot x$ and $V_i'(n) \cdot y = V_i(n) \cdot y$. The method 300 proceeds from step 316 to end step 399. The method 300 is repeated for additional macroblocks and additional frames. Note that if a reference frame is identified using the method 300, a previous reference frame may still be used should the selected reference frame prove to be unsatisfactory.

In one embodiment, at step 314, the x and y components of the functional are compared to their respective thresholds, $T_{Fx}$ and $T_{Fy}$. The threshold values $T_{Fx}$ and $T_{Fy}$ can be independent of each other or related. If either the x- or y-component of the functional is greater than its respective threshold, $T_{Fx}$ and $T_{Fy}$, the functional does not satisfy the threshold. If both the x and y components of the functional are less than their respective thresholds then the functional does satisfy the threshold. In one embodiment, the threshold values, $T_{Fx}$ and $T_{Fy}$, are analytically defined threshold values for the functional F. The initial value for $T_{Fx}$ and $T_{Fy}$ can be empirically defined. Based on encoding scenarios, $T_{Fx}$ and $T_{Fy}$ can be adaptively set using information from the encoding process. For example, when there are scene cuts in the video sequence, $T_{Fx}$ and $T_{Fy}$ may be increased to avoid unnecessary searching of all reference frames in the buffer. Rather, using a long term reference frame selected before the scene cut should be considered. When there is a strict restriction in the computation complexity due to the processing power of the device, $T_{Fx}$ and $T_{Fy}$ can be set such that the encoding process will always select the reference frame that is temporally closest to the coding frame. In essence, actively managing $T_{Fx}$ and $T_{Fy}$ makes the complexity of the encoding process scalable.

Pseudocode describing the above-described embodiment of the method 300 is shown below.

```
Reference frame number = most recent frame encoded;
While(Reference frame number < maximum reference frame number)
{
    Perform motion estimation;
    Compute x- and y-components of functional;
    If ((F_x > T_{Fx}) or (F_y > T_{Fy}))
    {
```

-continued

```
        Increment reference frame number;
    }
    Else
    {
        Use current reference frame; // Stop searching
    }
}
```

While the above embodiment utilizes both the x and y components of the relative motion change, an alternate implementation can choose to utilize only one of the x component or y component in determining if the threshold is satisfied.

In another embodiment, at step 314, $\Delta_{mv_i}(n)$ and $\Delta_{sad_i}(n)$ are considered separately. In this case, the x components of alpha and beta are set to either 0 or 1, and the y components of alpha and beta are set to either 1 or 0, accordingly. Note that the x component of F will be one of $\Delta_{mv_i}(n).x$ or $\Delta_{sad_i}(n)$, and the y component will be one of $\Delta_{sad_i}(n)$ or $\Delta_{mv_i}(n).y$, accordingly. The x and y components of F are compared to a threshold. The threshold is $T_{mvx}$ and $T_{mvy}$ or $T_{sad}$. For the x component of F, $T_{mvx}$ is selected as the threshold if $\alpha_x$ is one, i.e., $F_x=\Delta_{mv_i}(n).x$; otherwise $T_{sad}$ is selected as the threshold, i.e., $F_x=\Delta_{sad_i}(n)$. For the y component of F, $T_{mvy}$ is selected as the threshold if $\alpha_y$ is one, i.e., $F_y=\Delta_{mv_i}(n).y$; otherwise $T_{sad}$ is selected as the threshold, i.e., $F_y=\Delta_{sad_i}(n)$. If either the x- or y-component of the functional is greater than its respective threshold, the functional does not satisfy the threshold. If both the x and y components of the functional are less than their respective threshold, then the functional does satisfy the threshold.

In one embodiment, $T_{mvx}$, $T_{mvy}$ and $T_{sad}$ are analytically defined threshold values for the x and y components of the motion vector and SAD, respectively. The values of $T_{mvx}$ and $T_{mvy}$ can be independent or related. The initial values for $T_{mvx}$, $T_{mvy}$ and $T_{sad}$ can be empirically defined. Similar to $T_{Fx}$ and $T_{Fy}$, these threshold values can be adaptive based on the encoding scenarios and intermediate results. Pseudocode describing this embodiment of the method 300 utilizing both the x and y motion vector components is shown below.

```
Reference frame number = most recent frame encoded;
While(Reference frame number < maximum reference frame number)
{
    Perform motion estimation;
    Compute x- and y-components of functional;
    If ((Δ_{mv_i}(n).x > T_{mvx}) or (Δ_{mv_i}(n).y > T_{mvy}))
    {
        Increment reference frame number;
    }
    Else if (Δ_{sad_i}(n) > T_{sad})
    {
        Increment reference frame number;
    }
    Else
    {
        Use current reference frame; // Stop searching
    }
}
```

While the above embodiment utilizes both the x and y components of the relative motion vector change, an alternate implementation can choose to utilize only one of the x component or y component in determining if the threshold is satisfied in order to select a reference frame.

Based on complexity requirements from an application and on the exemplary embodiment, one of two options can be used to carry on and terminate the searching process for a reference frame. The first option is to keep the historical values of the functional F and termination the searching process when the values of F are found to be increasing over the tested reference frames. If this is the case, the process of searching more reference frames is not yielding better results and the process should be terminated. In this case, the reference frame that provides minimum F is selected as the reference frame. The second option is to carry on the searching process following the above pseudo code until all candidate reference frames have been searched or the conditions to stop searching have been satisfied.

Figure 4:
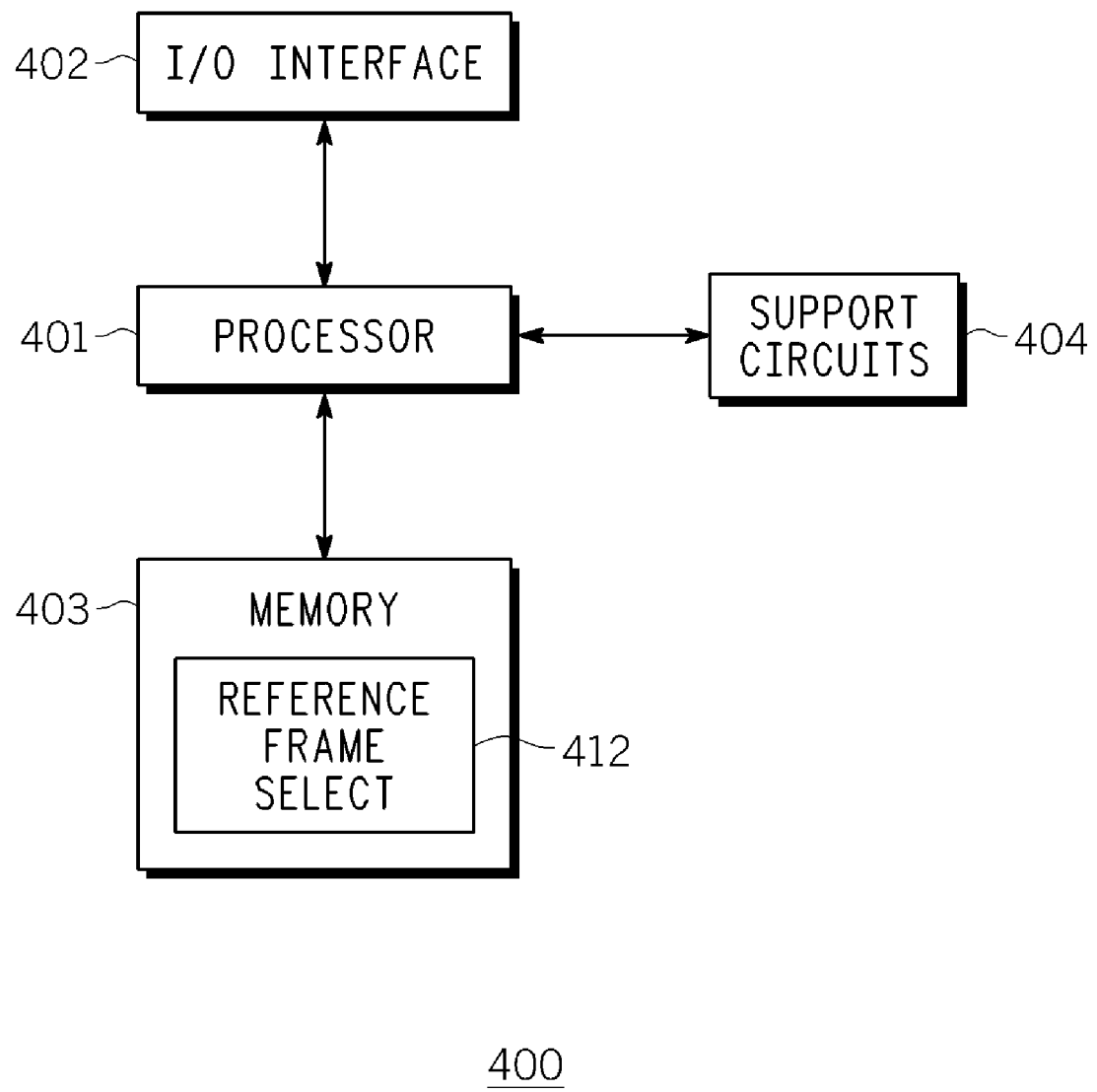
FIG. 4 is a block diagram depicting an exemplary embodiment of a motion estimator in accordance with one or more aspects of the invention.

FIG. 4 is a block diagram depicting an exemplary embodiment of a motion estimator 400 in accordance with one or more aspects of the invention. The motion estimator 400 includes a processor 401, a memory 403, various support circuits 404, and an I/O interface 402. The processor 401 may be any type of processing element known in the art, such as a microcontroller, digital signal processor (DSP), instruction-set processor, dedicated processing logic, or the like. The support circuits 404 for the processor 401 include conventional clock circuits, data registers, I/O interfaces, and the like. The I/O interface 402 may be directly coupled to the memory 403 or coupled through the processor 401. The I/O interface 402 may be coupled to a frame buffer and a motion compensator, as well as to receive input frames. The memory 403 may include one or more of the following random access memory, read only memory, magneto-resistive read/write memory, optical read/write memory, cache memory, magnetic read/write memory, and the like, as well as signal-bearing media as described below.

In one embodiment, the memory 403 stores processor-executable instructions and/or data that may be executed by and/or used by the processor 401 as described further below. These processor-executable instructions may comprise hardware, firmware, software, and the like, or some combination thereof. Modules having processor-executable instructions that are stored in the memory 403 include reference frame search module 412. The reference frame search module 412 is configured to perform the method 300 of FIG. 3. That is, the reference frame search module 412 uses motion vector data and previous motion estimation statistics to select a reference frame. Although one or more aspects of the invention are disclosed as being implemented as a processor executing a software program, those skilled in the art will appreciate that the invention may be implemented in hardware, software, or a combination of hardware and software. Such implementations may include a number of processors independently executing various programs and dedicated hardware, such as ASICs.

An aspect of the invention is implemented as a program product for execution by a processor. Program(s) of the program product defines functions of embodiments and can be contained on a variety of signal-bearing media (computer readable media), which include, but are not limited to: (i) information permanently stored on non-writable storage media (e.g., read-only memory devices within a computer such as CD-ROM or DVD-ROM disks readable by a CD-ROM drive or a DVD drive); (ii) alterable information stored on writable storage media (e.g., floppy disks within a diskette drive or hard-disk drive or read/writable CD or read/writable DVD); or (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct functions of the invention, represent embodiments of the invention.

Method and apparatus for selecting a reference frame for motion estimation in video encoding has been described. In one embodiment, a reference frame selection process uses motion vectors and previous motion estimation statistics to identify a desired reference frame for motion estimation. The motion vectors and previous motion estimation statistics for a current macroblock and a selected reference frame are used to compute a functional, which is then compared to a threshold. If the functional satisfies the threshold, the selected reference frame is maintained. Otherwise, the process is repeated for additional reference frames. Selection of a value for the threshold will dictate the number of reference frames searched. The threshold can be set such that the nearest reference frame temporally is selected a majority of the time. Experiments performed by the inventors have revealed significant complexity reduction in encoding a video sequence without compromising the encoded video quality.

While the foregoing is directed to illustrative embodiments of the present invention, other and further embodiments of the invention may be devised without departing from the basic scope thereof, and the scope thereof is determined by the claims that follow.

What is claimed is:

1. A method of selecting a reference frame for encoding a video, comprising:
   performing motion estimation on a current macroblock in a current frame with respect to a reference frame to obtain a motion vector, a sum of absolute difference (SAD), a global motion vector, and an average SAD;
   computing a first relative change of the motion vector with respect to the global motion vector;
   computing a second relative change of the SAD with respect to the average SAD;
   computing a functional based on the first relative change, the second relative change, a first parameter, and a second parameter;
   comparing the functional to at least one threshold; and
   selecting the reference frame if the functional satisfies the at least one threshold.

2. The method of claim 1, further comprising:
   repeating the steps of performing, computing the first relative change, computing the second relative change, computing the functional, comparing, and selecting with another reference frame if the functional does not satisfy the at least one threshold.

3. The method of claim 1, wherein the functional comprises an x-component and a y-component, wherein the x-component of the functional comprises the sum of (1) an x-component of the first parameter times the an x-component of the first relative change and (2) an x-component of the second parameter times the second relative change, and wherein the y-component of the functional comprises the sum of (1) a y-component of the first parameter times a y-component of the first relative change and (2) a y-component of the second parameter times the second relative change.

4. The method of claim 3, wherein the at least one threshold comprises a first threshold, and wherein the step of comparing comprises:
   comparing the x-component of the functional with the first threshold; and
   comparing the y-component of the functional with the first threshold.

5. The method of claim 4, wherein the reference frame is selected if both the x-component of the functional and the y-component of the functional satisfy the first threshold.

6. The method of claim 3, wherein the at least one threshold comprises a first threshold and a second threshold, and wherein the step of comparing comprises:
   comparing the x-component of the first relative change with the first threshold;
   comparing the y-component of the first relative change with the first threshold; and
   comparing the second relative change with the second threshold.

7. The method of claim 6, wherein the reference frame is selected if (1) one or both the x-component of the first relative change and the y-component of the first relative change satisfy the first threshold and (2) the second relative change satisfies the second threshold.

8. A computer readable medium having instructions stored thereon that when executed by a processor cause the processor to perform a method of selecting a reference frame for encoding a video, comprising:
   performing motion estimation on a current macroblock in a current frame with respect to a reference frame to obtain a motion vector, a sum of absolute difference (SAD), a global motion vector, and an average SAD;
   computing a first relative change of the motion vector with respect to the global motion vector;
   computing a second relative change of the SAD with respect to the average SAD;
   computing a functional based on the first relative change, the second relative change, a first parameter, and a second parameter;
   comparing the functional to at least one threshold; and
   selecting the reference frame if the functional satisfies the at least one threshold.

9. The computer readable medium of claim 8, further comprising:
   repeating the steps of performing, computing the first relative change, computing the second relative change, computing the functional, comparing, and selecting with another reference frame if the functional does not satisfy the at least one threshold.

10. The computer readable medium of claim 8, wherein the functional comprises an x-component and a y-component, wherein the x-component of the functional comprises the sum of (1) an x-component of the first parameter times the an x-component of the first relative change and (2) an x-component of the second parameter times the second relative change, and wherein the y-component of the functional comprises the sum of (1) a y-component of the first parameter times a y-component of the first relative change and (2) a y-component of the second parameter times the second relative change.

11. The computer readable medium of claim 10, wherein the at least one threshold comprises a first threshold, and wherein the step of comparing comprises:
    comparing the x-component of the functional with the first threshold; and
    comparing the y-component of the functional with the first threshold.

12. The computer readable medium of claim 11, wherein the reference frame is selected if both the x-component of the functional and the y-component of the functional satisfy the first threshold.

13. The computer readable medium of claim 10, wherein the at least one threshold comprises a first threshold and a second threshold, and wherein the step of comparing comprises:
    comparing the x-component of the first relative change with the first threshold;

comparing the y-component of the first relative change with the first threshold; and comparing the second relative change with the second threshold.

14. The computer readable medium of claim 13, wherein the reference frame is selected if (1) one or both the x-component of the first relative change and the y-component of the first relative change satisfy the first threshold and (2) the second relative change satisfies the second threshold.

15. Apparatus for selecting a reference frame for encoding a video, comprising:

means for performing motion estimation on a current macroblock in a current frame with respect to a reference frame to obtain a motion vector, a sum of absolute difference (SAD), a global motion vector, and an average SAD;

means for computing a first relative change of the motion vector with respect to the global motion vector;

means for computing a second relative change of the SAD with respect to the average SAD;

means for computing a functional based on the first relative change, the second relative change, a first parameter, and a second parameter;

means for comparing the functional to at least one threshold; and means for selecting the reference frame if the functional satisfies the at least one threshold.

16. The apparatus of claim 15, wherein the functional comprises an x-component and a y-component, wherein the x-component of the functional comprises the sum of (1) an x-component of the first parameter times the an x-component of the first relative change and (2) an x-component of the second parameter times the second relative change, and wherein the y-component of the functional comprises the sum of (1) a y-component of the first parameter times a y-component of the first relative change and (2) a y-component of the second parameter times the second relative change.

17. The apparatus of claim 16, wherein the at least one threshold comprises a first threshold, and wherein the means for comparing comprises:

means for comparing the x-component of the functional with the first threshold; and means for comparing the y-component of the functional with the first threshold.

18. The apparatus of claim 17, wherein the reference frame is selected if both the x-component of the functional and the y-component of the functional satisfy the first threshold.

19. The apparatus of claim 16, wherein the at least one threshold comprises a first threshold and a second threshold, and wherein the means for comparing comprises:

means for comparing the x-component of the first relative change with the first threshold;

means for comparing the y-component of the first relative change with the first threshold; and means for comparing the second relative change with the second threshold.

20. The apparatus of claim 19, wherein the reference frame is selected if (1) one or both the x-component of the first relative change and the y-component of the first relative change satisfy the first threshold and (2) the second relative change satisfies the second threshold.

* * * * *